United States Patent
Matsumiya et al.

[11] Patent Number: 6,163,973
[45] Date of Patent: Dec. 26, 2000

[54] NON-CONTACT SURFACE ROUGHNESS MEASURING DEVICE

[75] Inventors: Sadayuki Matsumiya; Masanori Arai; Nobuyuki Nakazawa, all of Kawasaki, Japan

[73] Assignee: Mitutoyo Corporation, Kawasaki, Japan

[21] Appl. No.: 09/188,144

[22] Filed: Nov. 9, 1998

[30] Foreign Application Priority Data

Nov. 12, 1997 [JP] Japan .................................. 9-310383

[51] Int. Cl.⁷ .............................. G01B 5/00; G01B 5/004
[52] U.S. Cl. .............................. 33/559; 33/556; 33/558; 33/503
[58] Field of Search .............................. 33/1 M, 503, 504, 33/505, 549, 551, 553, 554, 555, 561, 702, DIG. 2, 550, 552, 556, 557, 558, 559, 560

[56] References Cited

U.S. PATENT DOCUMENTS

| | | | |
|---|---|---|---|
| 4,177,568 | 12/1979 | Werner et al. | 33/DIG. 2 |
| 4,819,339 | 4/1989 | Kunzmann et al. | 33/503 |
| 4,939,678 | 7/1990 | Beckwith, Jr. | 33/1 M |
| 4,958,438 | 9/1990 | Hemmelgarn | 33/503 |
| 4,997,274 | 3/1991 | Takakusagi et al. | |
| 5,018,280 | 5/1991 | Enderle et al. | 33/561 |
| 5,058,433 | 10/1991 | Wilson et al. | 33/561 |
| 5,446,545 | 8/1995 | Taylor | 356/358 |
| 5,526,576 | 6/1996 | Fuchs et al. | 33/503 |
| 5,594,668 | 1/1997 | Bernhardt et al. | 33/504 |
| 5,650,852 | 7/1997 | Chastain et al. | 33/702 |
| 5,768,792 | 6/1998 | Raab | 33/503 |

*Primary Examiner*—Diego Gutierrez
*Assistant Examiner*—Quyen Doan
*Attorney, Agent, or Firm*—Oliff & Berridge, PLC

[57] ABSTRACT

A non-contact surface roughness-measuring machine is provided which can avoid damage caused by collision with a workpiece and set a non-contact surface roughness probe at an appropriate position relative to a measurement surface of the workpiece. A non-contact surface roughness probe and a touch-signal probe are attached at a tip end of an arm of a coordinate measuring machine. A stylus of the touch-signal probe is protruded relative to a detection surface of the non-contact surface roughness probe, in which the protrusion amount is within an optimum distance of the non-contact surface roughness probe relative to the measurement surface. When the probes are brought close to the workpiece and the touch-signal probe detects contact, the non-contact surface roughness probe is set within the optimum distance relative to the workpiece.

10 Claims, 6 Drawing Sheets

NON-CONTACT SURFACE ROUGHNESS MEASURING DEVICE

BACKGROUND OF THE INVENTION

1. Field of the Invention

The present invention relates to a non-contact surface roughness-measuring device. More specifically, the present invention relates to a non-contact surface roughness-measuring device which measures a surface roughness of a measurement surface of a workpiece without contacting thereto employing a coordinate measuring machine.

2. Description of Related Art

A contact-type surface roughness-measuring device of which a stylus is abutted to the measurement surface of the workpiece and moved thereon, thereby detecting a displacement of the stylus as an electric signal and measuring a surface roughness of the measurement surface by processing the electric signal is conventionally known as a surface roughness-measuring device for measuring a surface roughness of a measurement surface of a workpiece. Also, a non-contact surface roughness-measuring device, in which a laser beam is irradiated to the measurement surface of the workpiece thereby measuring the surface roughness of the measurement surface by a reflection ratio of the laser beam is conventionally known.

In recent years, surface roughness of sliding sections of automobile engine parts is newly required to be measured in addition to conventional dimension measurement to improve distance/fuel ratio.

To meet the demand, it is considered to attach a probe of the non-contact surface roughness-measuring device to a (three-dimensional) coordinate measuring machine for measuring as an in-line equipment.

However, the following disadvantages occur by simply attaching the non-contact surface roughness probe to the coordinate measuring machine.

① The non-contact surface roughness probe must be positioned at a predetermined distance from detection surface thereof to the measurement surface. However, the coordinate measuring machine cannot recognize the position of the detection surface, therefore, calibration is extremely difficult.

② Since the non-contact surface roughness probe is made to detect only roughness, even when the non-contact surface roughness probe touches the workpiece, the coordinate measuring machine cannot detect contact therebetween, which can result in damage in the non-contact surface roughness probe and the coordinate measuring machine itself.

SUMMARY OF THE INVENTION

The object of the present invention is to provide a non-contact surface roughness-measuring machine solving the aforementioned conventional problems, which can avoid damage caused by collision with the workpiece and set a non-contact surface roughness probe at an appropriate position.

The non-contact surface roughness-measuring device according to the present invention has a moving mechanism for moving a movable section, a non-contact surface roughness probe attached to the movable section of the moving mechanism, the non-contact surface roughness probe non-contactly measuring a surface roughness of a measurement surface and a touch-signal probe attached to the movable section. The non-contact surface roughness-measuring device is characterized in that the touch-signal probe has a stylus which can be displaced and returned (or reseated) to a neutral position (or a rest position) and a touch-signal generator for generating a touch-signal when the stylus is displaced, and that a tip end of the stylus is protruded beyond a detection surface of the non-contact surface roughness probe.

The protrusion amount of the stylus is preferably greater than a distance by which the stylus is moved to overrun by inertia thereof when the stylus is abutted to the measurement surface causing the touch-signal probe to generate a touch-signal to stop driving the moving mechanism.

It is preferable for the touch-signal probe to have a structure in which the stylus can be displaced without damaging against the overrun and can be reseated to an initial position (or a rest position). For such escape mechanism of the stylus, any conventional structures for elastically displacing in a direction to abut to a workpiece, such as a structure in which the stylus is supported floatingly by a spring or the like, can be adopted.

For setting the non-contact probe at an optimum distance relative to the measurement surface, the non-contact surface roughness probe is brought close to the measurement surface. Then, the stylus of the touch-signal probe touches the measurement surface and is displaced, thereby causing the touch-signal probe to generate touch-signal.

Here, the protrusion amount of the stylus relative to the detection surface of the non-contact surface roughness probe and the optimum distance of the non-contact surface roughness probe relative to the measurement surface are stored in advance. The non-contact surface roughness probe can be set at the optimum distance relative to the measurement surface by moving the non-contact surface roughness probe close to, or away from the measurement surface based on a difference between the protrusion amount and the optimum distance. Accordingly, the non-contact surface roughness probe can be positioned at an appropriate position relative to the workpiece while avoiding damage by a collision to the workpiece.

When the non-contact surface roughness probe is moved toward the measurement surface with the stylus of the touch-signal probe being abutted to the measurement surface based on the difference between the protrusion amount of the stylus relative to the detection surface of the non-contact surface roughness probe and the optimum distance of the non-contact surface roughness probe relative to the measurement surface, it is preferable for the touch-signal probe to have an escape mechanism for moving away from the measurement surface. For such escape mechanism, any conventional moving mechanism, such as, for example, a combination of a guide rail and a motor, or air cylinder, can be applicable.

On the other hand, if no touch-signal probe escape mechanism is provided, the touch-signal probe or measurement surface can be damaged. So it is preferable that the protrusion amount of the stylus relative to the detection surface of the non-contact surface roughness probe is less than the optimum distance of the non-contact surface roughness probe relative to a measurement surface.

According to the above structure, to position the non-contact surface roughness probe appropriately, the non-contact surface roughness probe is brought only away from the measurement surface at a difference between the protrusion amount of the stylus relative to the detection surface of the non-contact surface roughness probe and the optimum distance of the non-contact surface roughness probe relative to the measurement surface after the stylus of the touch-signal probe is abutted to the measurement surface. Therefore, damage to the touch-signal probe or measurement surface can be avoided without providing the escape mechanism.

The moving mechanism can be a robot or the like, but preferably a coordinate measuring machine which can move the movable section in three-dimensional directions orthogonal with each other.

DETAILED DESCRIPTION OF PREFERRED EMBODIMENT(S)

A preferred embodiment of the present invention will be described below with reference to the attached drawings.

Figure 1:
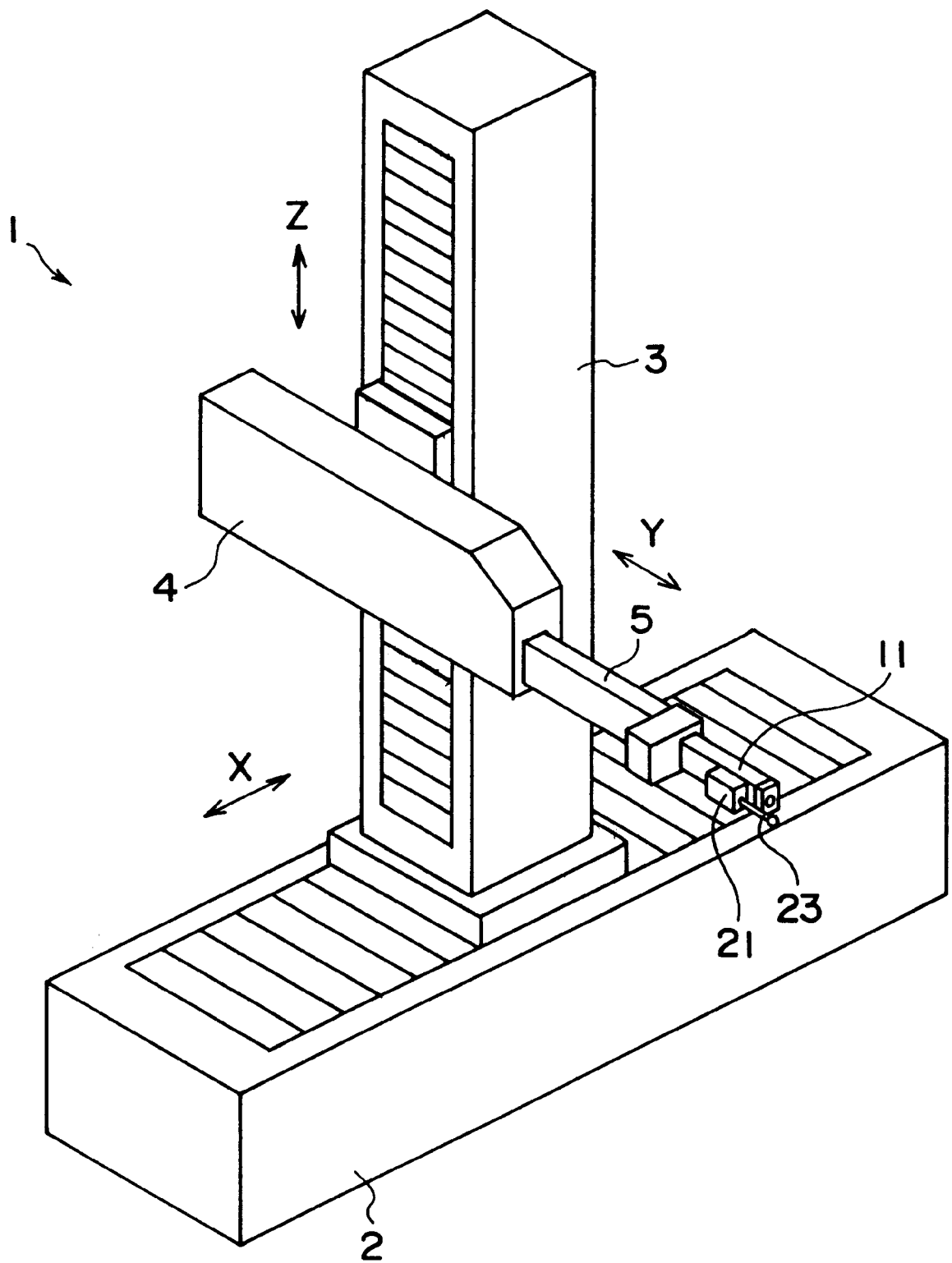
FIG. 1 is a perspective view showing a preferred embodiment of a non-contact surface roughness-measuring device according to the present invention.

FIG. 1 is a perspective view showing a measurement device according to the present embodiment. The measuring device has a coordinate measuring machine 1 as a moving mechanism. The coordinate measuring machine 1 has a base 2, a column 3 provided on the base 2 to be movable in a longitudinal direction of the base 2 (X-axis direction), a slider 4 provided on the column 3 to be elevatable up and down (in Z-axis direction) and an arm 5 provided on the slider 4 to be movable back and forth (in Y-axis direction).

Figure 2:
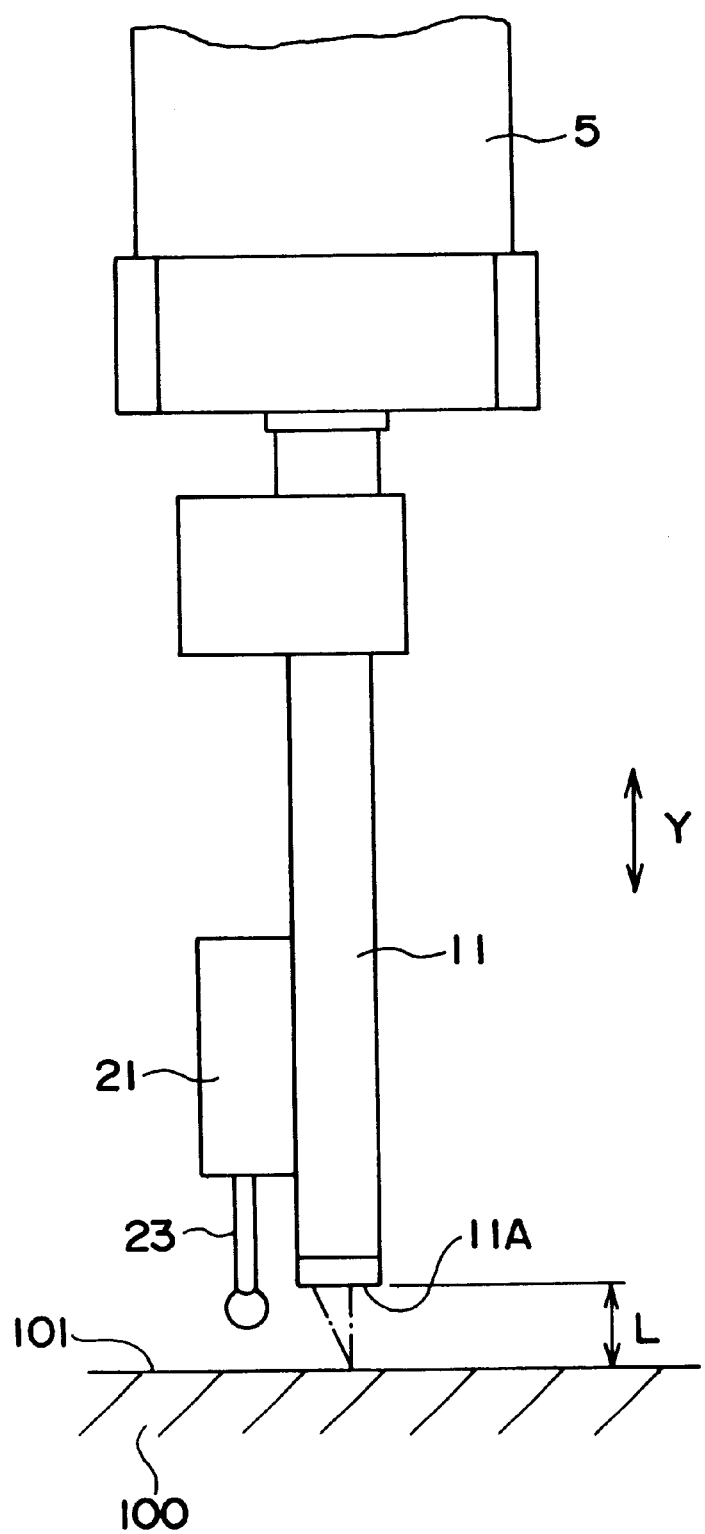
FIG. 2 is a view showing an attachment condition of a non-contact surface roughness probe and a touch-signal probe to an arm of a coordinate measuring machine according to the aforementioned embodiment.

At the tip end of the arm 5, in other words, at the pointed end section of the arm 5 as a movable section which can be moved in X,Y and Z-axis direction orthogonal with each other, a non-contact surface roughness probe 11 for non-contactly measuring a surface roughness of a measurement surface 101 of a workpiece 100 is attached as shown in FIG. 2. A touch-signal probe 21 is attached to the non-contact surface roughness probe 11.

Figure 3:
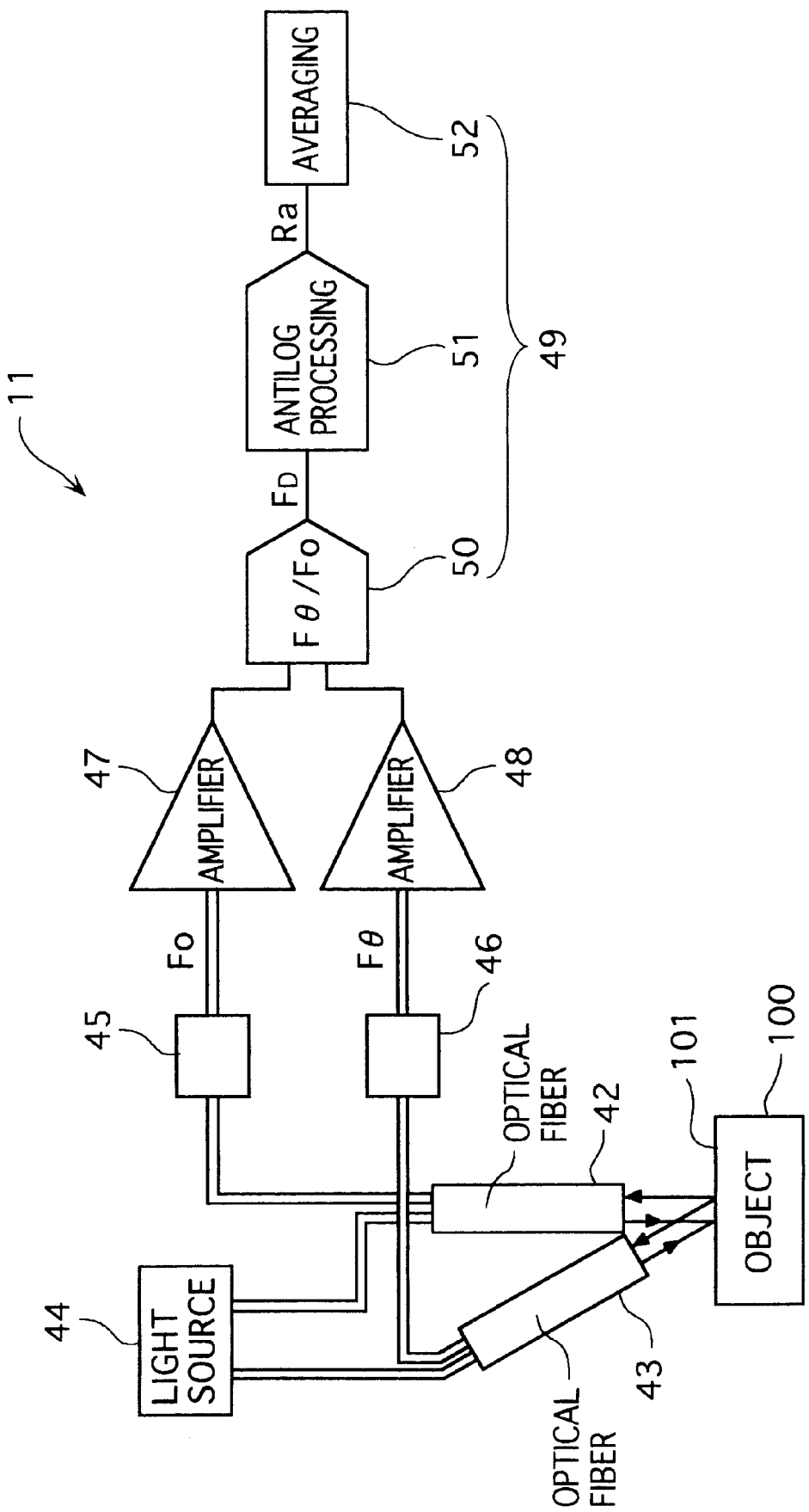
FIG. 3 is a diagram showing a structure of the non-contact surface roughness probe according to the aforementioned embodiment.

As shown in FIG. 3, the non-contact surface roughness probe 11 has first and second optical fibers 42, 43 respectively having optical axes intersecting at 30 degrees, a light source 44 for irradiating the measurement surface 101 through the optical fibers 42 and 43, a first reception unit 45 for receiving light reflected by the measurement surface 101 through the first optical fiber 42, a second reception unit 46 for receiving light reflected by the measurement surface 101 through the second optical fiber 43, amplifiers 47 and 48 for amplifying outputs F0 and Fθ of the first and second reception unit 45 and 46, respectively, and processing device 49. Incidentally, the first and second optical fiber 42, 43 respectively are so structured that optical inlet and outlet are provided both inside and outside, and the optical axis of the first optical fiber 42 is perpendicular to the measurement surface 101.

The processing device 49 includes division processor 50 for calculating an output ratio FD (=Fθ/F0) of the amplifiers 47 and 48, a first processor 51 for calculating surface roughness (center line average roughness) Ra by conducting antilogarithm calculation of the division processor output FD by the division processor 50, and a second processor for calculating an average value by averaging surface roughness data calculated by the first processor 51.

The surface roughness data Ra calculated by the first processor 51 is shown in an expression of;

$$Ra = 10^{(FD/K - M/K)}$$

In the above expression, M and K are constants to be changed depending on materials and processed condition of the workpiece 100.

Figure 4:
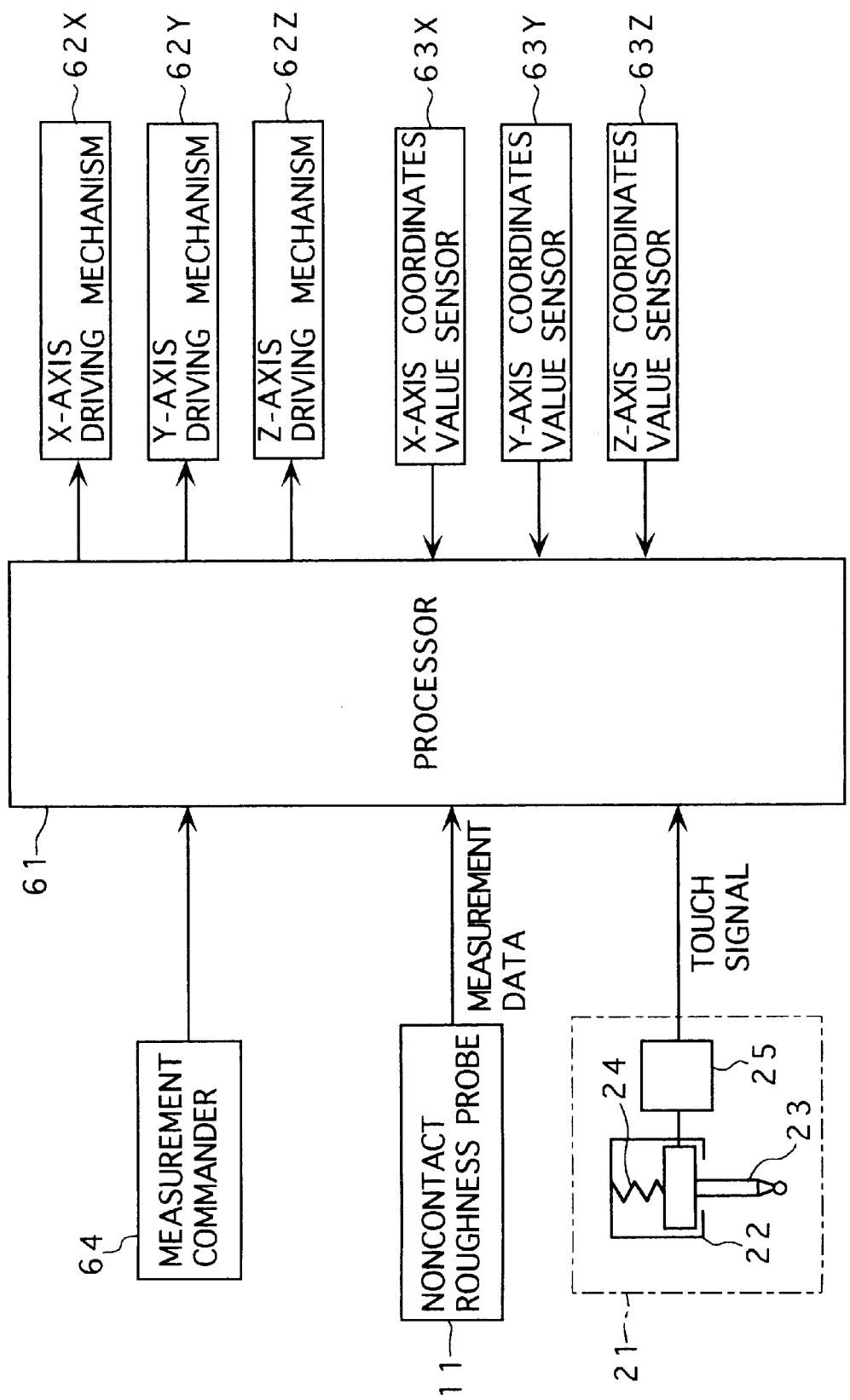
FIG. 4 is a block diagram showing a driving control system according to the aforementioned embodiment.

FIG. 4 is a block diagram showing a driving control system of the measuring device according to the present embodiment. In FIG. 4, 61 is a processor. The processor 61 has an X-axis driving mechanism 62X for driving the column 3 in the X-axis direction, a Y-axis driving mechanism 62Y for driving the arm 5 in the Y-axis direction, a Z-axis driving mechanism 62Z for driving the slider 4 in the Z-axis direction, an X-axis coordinate value sensor 63X for detecting a coordinates value of the column 3 in the X-axis direction, a Y-axis coordinate value sensor 63Y for detecting a coordinates value of the arm 5 in the Y-axis direction, a Z-axis coordinate value sensor 63Z for detecting a coordinates value of the slider 4 in the Z-axis direction and a measurement commander 64 such as a keyboard and a joystick connected thereto. Further, the non-contact surface roughness probe 11 and the touch-signal probe 21 are connected to the processor 61.

The touch-signal probe 21 includes a case 22, a stylus 23 mounted in the case 22 to be displaceable in three-dimensional directions (i.e. X, Y and Z-axis directions), an biasing element 24 such as a spring for holding the stylus 23 in a rest position and a touch-signal generator 25 for generating a touch-signal when the stylus 23 is displaced against the biasing element 24.

The pointed end of the stylus 23 has a predetermined relationship with the non-contact surface roughness probe 11. In other words, the pointed end of the stylus 23 protrudes relative to the detection surface 11A of the non-contact surface roughness probe 11 in a detection direction (downward direction in the FIG. 2), and the distance between the pointed end and the detection surface 11A is shorter than an optimum distance L of the non-contact surface roughness probe 11 relative to the measurement surface 101. However, the protrusion amount of the pointed end of the stylus 23 is at least greater than the movement amount of the stylus 23 overrun by inertia thereof when the stylus 23 touches the measurement surface and the moving mechanism driving is stopped at the generation of the touch-signal from the touch-signal probe.

Next, the measurement process according to the present embodiment is described with reference to FIGS. 5, 6 and 7.

Figure 5:
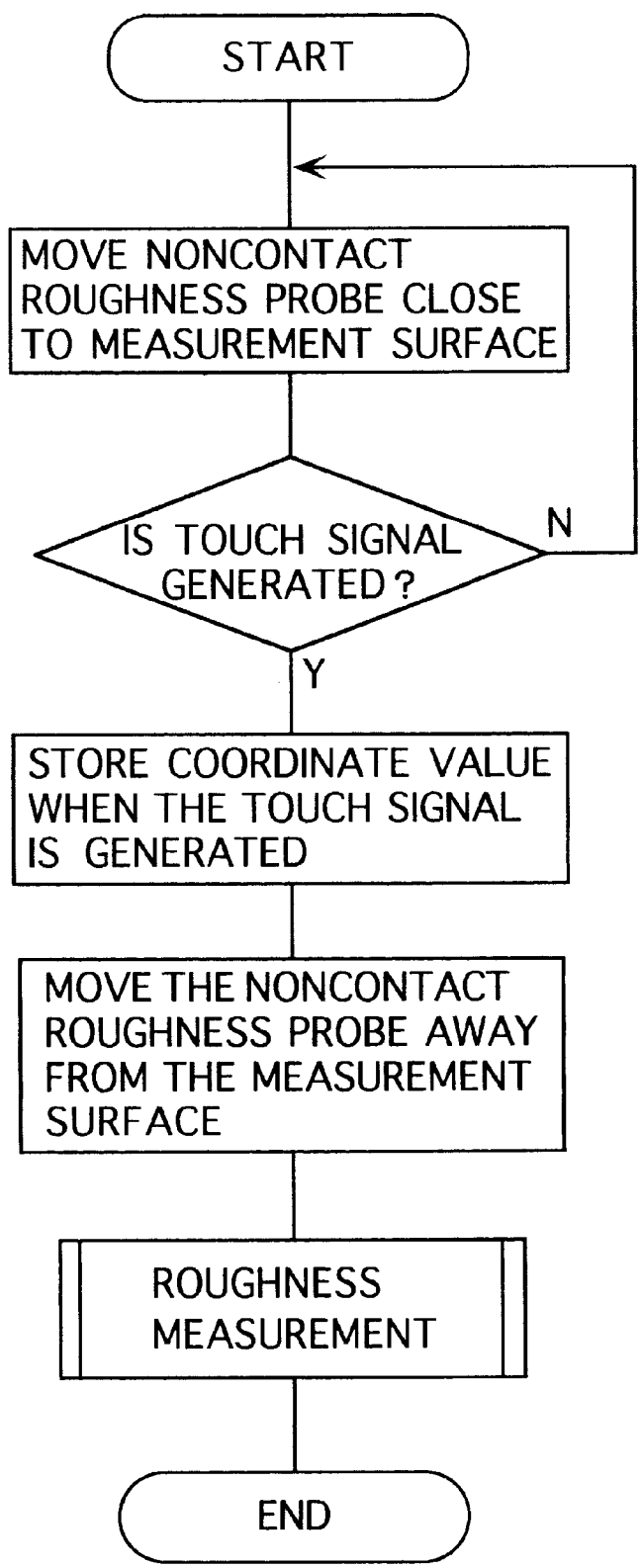
FIG. 5 is a flow diagram showing a measurement process according to the aforementioned embodiment.

Roughness measurement is carried out in accordance with the steps shown in the flow chart of FIG. 5. First, the non-contact surface roughness probe 11 is brought close to the measurement surface 101 of the workpiece 100. For example, when the non-contact surface roughness probe 11 and the measurement surface 101 of the workpiece 100 are at the positions shown in FIG. 2, the arm 5 of the coordinate measuring machine 1 is advanced in the Y-axis direction, and it is checked whether the touch-signal is generated from the touch-signal probe 21 or not.

Figure 6:
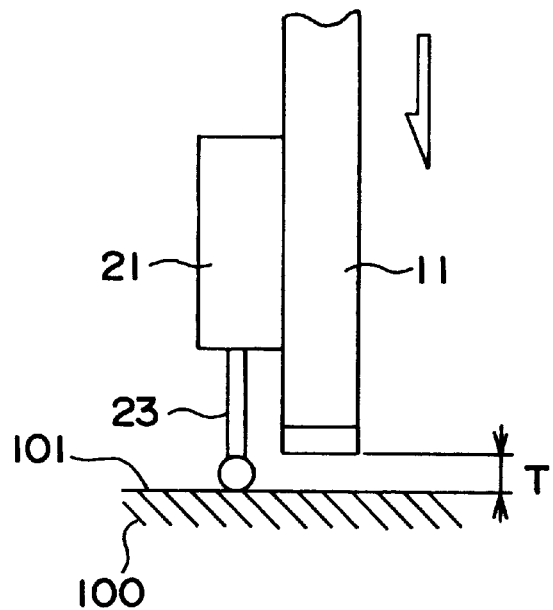
FIG. 6 is a view showing a state when the non-contact surface roughness probe is moved toward the measurement surface.

As shown in FIG. 6, when the stylus 23 of the touch-signal probe 21 touches the measurement surface 101 of the workpiece 100 and is displaced, the touch-signal is generated from the touch-signal probe 21. Then, the processor 61 recognizes the touch-signal, and coordinates values at that moment, in other words, coordinates values of the X, Y and Z-axis driving mechanism 62X, 63Y, 63Z are stored. In addition, the advance of the arm 5 in the Y-axis direction is stopped.

Next, the non-contact surface roughness probe 11 is moved away from the measurement surface 101 of the workpiece 100 at a distance of (L-T). In other words, the arm 5 is retracted in Y-axis direction at a distance of the difference (L-T) between the optimum distance L of the non-contact surface roughness probe 11 relative to the measurement surface 101 and the protrusion amount T of the pointed end of the stylus 23 of the touch-signal probe 21 relative to the detection surface 11A of the non-contact surface roughness probe 11.

Figure 7:
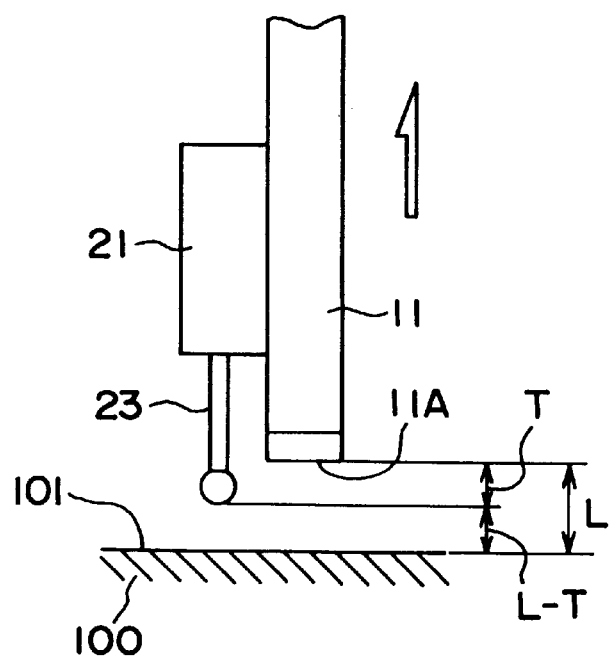
FIG. 7 is a view showing a state when the non-contact surface roughness probe is moved away from the measurement surface.

Then, the non-contact surface roughness probe 11 can be positioned at the optimum distance L relative to the measurement surface 101 of the workpiece 100, as shown in FIG. 7. The roughness measurement of the measurement surface 101 of the workpiece 100 is carried out in this condition.

According to the present embodiment, since the touch-signal probe 21 is attached to the pointed end of the arm 5 of the coordinate measuring machine 1 as well as the non-contact surface roughness probe 11 and the stylus 23 of the touch-signal probe 21 is protruded relative to the detection surface 11A of the non-contact surface roughness probe 11, the stylus 23 of the touch-signal probe 21 first touches the measurement surface 101 causing the touch-signal probe 21 to generate the touch-signal when the non-contact surface roughness probe 11 is moved close to the measurement surface 101 in setting the non-contact surface roughness probe 11 at the optimum distance relative to the measurement surface 101, thereby enabling the optimum distance L of the non-contact surface roughness probe 11 relative to the measurement surface 101 to be set on the basis of the stylus position.

In other words, the non-contact surface roughness probe 11 can be set at the optimum distance L on the basis of the difference (L-T) between the optimum distance L of the non-contact surface roughness probe 11 relative to the measurement surface 101 and the protrusion amount T of the pointed end of the stylus 23 of the touch-signal probe 21. Accordingly, the non-contact surface roughness probe can be set at an appropriate position relative to the measurement surface 101 of the workpiece 100 while avoiding damage caused by collisions against the workpiece 100.

Further, since the protrusion amount T of the stylus 23 of the touch-signal probe 21 is within the optimum distance L of the non-contact surface roughness probe 11 relative to the measurement surface 101, the non-contact surface roughness probe is brought only away from the measurement surface at a difference between the protrusion amount of the stylus relative to the detection surface of the non-contact surface roughness probe and the optimum distance of the non-contact surface roughness probe relative to the measurement surface after the stylus of the touch-signal probe is abutted to the measurement surface. Therefore, damage of the touch-signal probe or measurement surface can be avoided.

In other words, it is necessary to provide touch-signal probe escape mechanism for moving the non-contact surface roughness probe 21 toward the measurement surface 101 based on the aforesaid difference (L-T). However, since the protrusion amount T of the stylus 23 relative to the detection surface 11A of the non-contact surface roughness probe 11 is set within the optimum distance L of the non-contact surface roughness probe relative to a measurement surface, the non-contact surface roughness probe 11 is only moved away from the measurement surface 101. Accordingly, no escape mechanism is necessary for avoiding damages on the touch-signal probe 21 or the measurement surface 101.

Incidentally, though the protrusion amount T of the stylus 23 relative to the detection surface 11A of the non-contact surface roughness probe 11 is set within the optimum distance L of the non-contact surface roughness probe 11 relative to the measurement surface 101 in the above embodiment, it is only required that the stylus 23 is at least protruded relative to the detection surface 11A of the non-contact surface roughness probe 11. In this case, the non-contact surface probe 21 has to be moved toward the measurement surface 101 depending on the protrusion amount T of the stylus 23 relative to the detection surface 11A. However, problems accompanying contact with the workpiece can be avoided by providing an escape mechanism of the touch-signal probe 21.

Though the coordinate measuring machine having the arm 5 protruded in a horizontal direction is employed as a moving mechanism in the above-described embodiment, however, a coordinate measuring machine having portal (bridge-type) structure also can be used. Industrial robots of other structure can also be employed. With regard to moving direction, it is not limited to three-dimensional directions, but a moving mechanism for only one-axis direction or two-axis directions can also be used.

The structure of the non-contact surface roughness probe 11 is not restricted to the structure of FIG. 3 described in the aforesaid embodiment, but other probes using other detection methods may be applicable.

The touch-signal probe 21 is also not restricted to the structure of FIG. 4, and other structures can be employed as long as the touch-signal is generated when the stylus 23 touches the measurement surface 101.

What is claimed is:

1. A non-contact surface roughness-measuring device comprising:

a movable section;

a moving mechanism for moving the movable section;

a non-contact surface roughness probe having a detection surface, the non-contact surface roughness probe being attached to the movable section and for non-contactly measuring a surface roughness of a measurement surface; and a touch-signal probe attached to the movable section, the touch-signal probe having a stylus which can be displaced and reseated to a rest position and a touch-signal generator that generates a touch-signal when the stylus is displaced, the stylus having a tip end, wherein the tip end of the stylus is protruded beyond the detection surface of the non-contact surface roughness probe.

2. The non-contact surface roughness-measuring device according to claim 1, wherein a protrusion amount of the tip end of the stylus relative to the detection surface of the non-contact surface roughness probe is less than an optimum distance of the non-contact surface roughness probe relative to the measurement surface.

3. The non-contact surface roughness-measuring device according to claim 1, further comprising an escape mechanism for moving the touch-signal probe away from the measurement surface between the touch-signal probe and the movable section.

4. The non-contact surface roughness-measuring device according to claim 1, wherein a protrusion amount of the stylus is greater than a distance by which the stylus is moved to overrun by inertia thereof when the stylus is abutted to the measurement surface causing the touch-signal probe to generate a touch-signal to stop driving the moving mechanism.

5. The non-contact surface roughness-measuring device according to claim 1, wherein the touch-signal probe has a structure in which the stylus can be displaced in a direction to abut to a workpiece and can be reseated to a rest position.

6. The non-contact surface roughness-measuring device according to claim 1, wherein the moving mechanism is a coordinate measuring machine which can move the movable section in three-dimensional directions orthogonal with each other.

7. A non-contact surface roughness-measuring device comprising:

a movable section;

a non-contact surface roughness probe having a detection surface, the non-contact surface roughness probe being attached to the movable section and for non-contactly measuring a surface roughness of a measurement surface; and a touch-signal probe attached to the movable section, the touch-signal probe having a stylus which can be displaced and reseated to a rest position and a touch-signal generator that generates a touch-signal when the stylus is displaced, the stylus having a tip end, wherein the tip end of the stylus is protruded beyond the detection surface of the non-contact surface roughness probe, and wherein a protrusion amount of the tip end of the stylus relative to the detection surface of the non-contact surface roughness probe is less than an optimum distance of the non-contact surface roughness probe relative to the measurement surface.

8. The non-contact surface roughness-measuring device according to claim 7, wherein the protrusion amount of the stylus is greater than a distance by which the stylus is moved to overrun by inertia thereof when the stylus is abutted to the measurement surface causing the touch-signal probe to generate a touch-signal to stop driving the moving mechanism.

9. The non-contact surface roughness-measuring device according to claim 7, wherein the touch-signal probe has a structure in which the stylus can be displaced in a direction to abut to a workpiece and can be reseated to a rest position.

10. The non-contact surface roughness-measuring device according to claim 7, wherein the moving mechanism is a coordinate measuring machine which can move the movable section in three-dimensional directions orthogonal with each other.

* * * * *